United States Patent
Buchholz et al.

(10) Patent No.: US 6,493,766 B1
(45) Date of Patent: *Dec. 10, 2002

(54) METHOD, CLIENT DEVICE, SERVER AND ARTICLE OF MANUFACTURE FOR COMPRESSING UNIVERSAL RESOURCE IDENTIFIERS USING LEFT/RIGHT STRING SUBSTITUTION

(75) Inventors: Dale Robert Buchholz, Palatine; James Edward Van Peursem, Hanover Park, both of IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/107,894

(22) Filed: Jun. 30, 1998

(51) Int. Cl.[7] .............................................. G06F 15/16
(52) U.S. Cl. ........................ 709/247; 707/101; 708/203
(58) Field of Search ......................... 709/247; 707/101; 708/203

(56) References Cited

U.S. PATENT DOCUMENTS

| | | | | | |
|---|---|---|---|---|---|
| 5,307,413 A | * | 4/1994 | Denzer | ........................ | 380/49 |
| 5,511,159 A | * | 4/1996 | Baker et al. | ................. | 345/326 |
| 5,764,910 A | * | 6/1998 | Shachar | ...................... | 709/223 |
| 5,938,737 A | * | 8/1999 | Smallcomb et al. | ........ | 709/247 |
| 5,956,490 A | | 9/1999 | Buchholz et al. | | |
| 6,006,173 A | * | 12/1999 | Wiese et al. | ................. | 704/201 |
| 6,286,053 B1 | | 9/2001 | Van Peursem et al. | | |

* cited by examiner

Primary Examiner—Saleh Najjar
(74) Attorney, Agent, or Firm—Daniel W. Juffernbruch (57) ABSTRACT

The present invention includes a method (500, 600, 700, 800), client device (900, 1000), server (1100, 1200) and article of manufacture (900, 1000, 1100, 1200) for compressing/decompressing a universal resource identifier URI. The method includes the steps of: determining, starting at a first end of a string, a first count of characters that sequentially match between a previous register and a current register; determining, starting at a second end of the string, a second count of characters that sequentially match between the previous register and the current register, and encoding the URI based on the first count and the second count.

9 Claims, 7 Drawing Sheets

600

```
|←————————— 102 —————————→| 104
```

GET HTTP://JAVA.SUN.COM/JDK-BETA2/API/PACKAGES.HTML| HTTP/1.0
  PROXY-CONNECTION: KEEP-ALIVE
  USER-AGENT: MOZILLA/2.0B6 (X11; I; SUN OS 5.4 SUN4M)
  HOST: JAVA.SUN.COM
  ACCEPT: IMAGE/GIF, IMAGE/X-XBIT MAP, IMAGE/JPEG, IMAGE/PJPEG, */*

METHOD, CLIENT DEVICE, SERVER AND ARTICLE OF MANUFACTURE FOR COMPRESSING UNIVERSAL RESOURCE IDENTIFIERS USING LEFT/RIGHT STRING SUBSTITUTION

RELATED APPLICATIONS

The present application is related to the following application which is incorporated herein by reference: METHOD, CLIENT DEVICE, SERVER AND ARTICLE OF MANUFACTURE FOR COMPRESSING UNIVERSAL RESOURCE INDICATORS USING PARTITIONED LEFT/RIGHT STRING SUBSTITUTION by James Edward Van Peursem and Dale Robert Buchholz, application Ser. No. 09/107,663, now U.S. Pat. No. 6,286,053, and which is assigned to Motorola, Inc.

FIELD OF THE INVENTION

The present invention relates to universal resource indicators, and more particularly to compression of universal resource indicators.

BACKGROUND OF THE INVENTION

URLs or web addresses with respect to the Internet are known. As far as the HyperText Transport Protocol (HTTP) is concerned, these are Uniform Resource Identifiers (URIs) which include universal resource locators and/or universal resource names, i.e., formatted strings that identify a network resource by name, location or another predetermined characteristic. URIs throughout the rest of the text include universal resource identifiers, universal resource locators and universal resource names.

The compression of URIs in HTTP requests can provide throughput benefits by reducing the number of bytes that need to be transmitted. In any network where the uplink is shared and a contention-based access scheme is used to arbitrate transmissions, reducing the transmitted packet size makes it less likely to collide with another transmission. This is true of all variety of wireless networks, including wide-area packet data (e.g., Cellular Digital Packet Data (CDPD)), two-way paging (e.g., ReFLEX), and wireless LANs (RF and IR), as well as wired networks that provide wide-area data services, such as those emerging in the cable television industry. The URI is often a large part of the request. Therefore, compressing the URI may substantially reduce the probability for collision in the uplink or may provide better efficiency in bandwidth-constrained uplinks.

DETAILED DESCRIPTION OF A PREFERRED EMBODIMENT

With respect to HyperText Transport Protocol (HTTP), Universal Resource Identifiers (URIs) or web addresses are formatted strings which identify a network resource via name, location, or any other characteristic.

The compression of URIs in HTTP requests can provide throughput benefits by reducing the number of bytes that need to be transmitted. In any network where the uplink is shared and a contention-based access scheme is used to arbitrate transmissions, reducing the transmitted packet size makes it less likely to collide with another transmission. This is true of all variety of wireless networks, including wide-area packet data (e.g., CDPD), two-way paging (e.g., ReFLEX), and wireless LANs (RF and IR), as well as wired networks that provide wide-area data services, such as those emerging in the cable television industry. The URI is often a large part of the request. Therefore, compressing the URI may substantially reduce the probability for collision in the uplink or may provide better efficiency in bandwidth-constrained uplinks.

Figure 1:
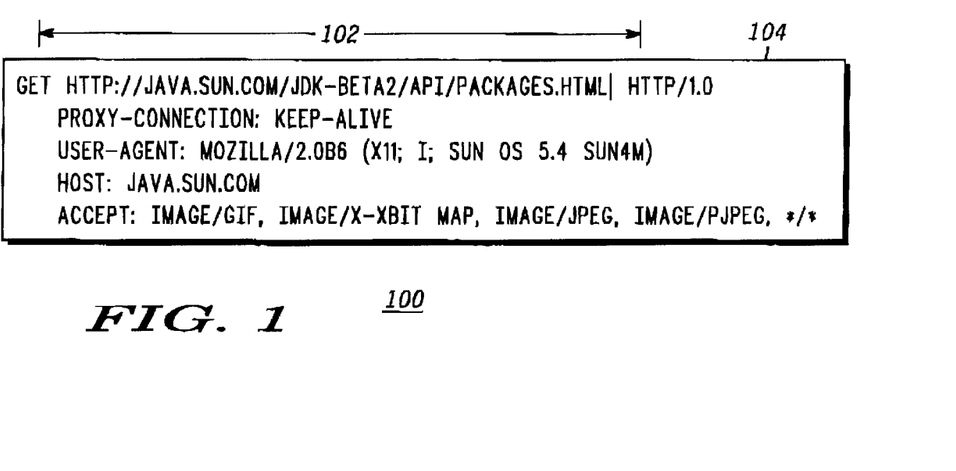
FIG. 1 is a schematic representation of an HTTP message format as is known in the art.

FIG. 1, numeral 100, shows a schematic representation of an HTTP message format as is known in the art. The format of the HTTP request (104) shows a plurality of lines, each indicating a separate field. The request fields are encoded in 7-bit or 8-bit ASCII. The CR/LF sequence at the end of each line acts as a separator for the different fields. Lateral white-space (LWS), e.g., space and tab, serves to delimit the parameters of a particular line. The length of the request in FIG. 1 is 231 characters.

The URI to be compressed (102) by the present invention is found in the first line between GET and HTTP/1.0, specifically:

http://java.sun.com/JDKbeta2/api/packages.html

The URI to be compressed is referred to as the Request-URI.

Having identified the field to be compressed, it is easy to see that a variety of industry-standard and proprietary compression schemes may be applied to the characters. The present invention provides an efficient method for compressing and decompressing URIs.

In the case of web browsing, a single user generates a stream of requests. To compress the request-URI in accordance with the present invention, compression is applied to the corresponding stream of characters for the request-URI. An example of the stream of request-URIs associated with a single user browsing the web is provided below:

http://www.ai.mit.edu/stocks/topstocks.html
http://www.ai.mit.edu/stocks/stock-graph.gif
http://www.ai.mit.edu/stocks/g/MOT.html
http://www.ai.mit.edu/stocks/price_graphs/MOT.gif
http://www.ai.mit.edu/stocks/vol_graphs/MOT.gif Closer inspection of the stream in the example yields the following observations:

there are many similar patterns of characters between adjacent URIs, left-to-right string comparison can yield substantial savings on the front of the URI, and right-to-left string comparison can yield substantial savings on the back.

These observations are utilized by the present invention's compression scheme that is based on left-to-right and right-to-left string matching. Simply stated, the Request-URI is replaced by a compressed version that includes an indication of how many characters from the left are the same as the previous Request-URI, followed by an indication of how many characters from the right are the same as the previous Request-URI, followed by the uncompressed characters.

The compression scheme is based on the comparison of two strings: previous, which represents the fully expanded URI requested prior to the current one, and current, which represents the fully expanded URI currently being requested. The compress process is as follows:

If previous is empty, then no compression is possible.
  Save current as previous for next comparison.
Else
  Compare current with previous from left-to-right.
    Replace the set of matched characters with an encoded count of the number of matched characters.
  Compare current with previous from right-to-left.
    Replace the set of matched characters with an encoded count of the number of matched characters.
  Add remaining uncompressed characters.
  Save current as previous for next comparison.

The format and placement of the compression indicators is explained as follows:

The syntax in Augmented BNF for the Request URIs in HTTP requests is set forth below. This is a subset of the entire HTTP syntax found in the HTTP/1.0 specification, as is known to those skilled in the art.

| Request | = Simple-Request I Full-Request |
|---|---|
| Simple-Request | = "GET" SP Request-URI CRLF |
| Full-Request | = Request-Line *(General-Header I Request-Header I Entity-Header) CRLF [Entity-Body] |
| Request-Line | = Method SP Request-URI SP HTTP-Version CRLF |
| Method | = "GET" I "HEAD" I "POST" I extension-method |
| Request-URI | = absoluteURI I abs_path |
| absoluteURI | = scheme ":" *(uchar I reserved) |
| abs_path | = "/" rel_path |
| rel_path | = [path]["; " params]["?" query] |
| path | = fsegment *("/" segment) |
| fsegment | = 1*pchar |
| segment | = *pchar |
| params | = param *(":" param) |

-continued

| param | = *(pchar I "/") |
|---|---|
| scheme | = 1*(ALPHA I DIGIT I "+" I "-" I ".") |
| query | = *(uchar I reserved) |
| pchar | = uchar I ":" I "@" I "&" I "=" I "+" |
| uchar | = unreserved I escape |
| unreserved | = ALPHA I DIGIT I safe I extra I national |
| escape | = "%" HEX HEX |
| reserved | = ";" I "/" I "?" I ":" I "@" I "&" I "=" I "+" |
| extra | = "!" I "*" I "'" I "(" I ")" I "," |
| safe | = "$" I "-" I "_" I "." |
| unsafe | = CTL I SP I <"> I "#" I "%" I "<" I ">" |
| national | = <any OCTET excluding ALPHA, DIGIT, reserved, extra, safe, and unsafe> |

The Request-URI is delimited by SP (space) after GET and before HTTP/1.0 in the HTTP/1.0 protocol, or by SP and CR-LF in HTTP/0.9 (for backward compatibility). In the case where the Request-URI is an absolute URI, it must begin with a valid scheme label. Scheme labels can only begin with one of (ALPHA | DIGIT| "+" | "-"|"."), where ALPHA represents the upper and lower case A–Z and DIGIT represents the numbers 0–9. In the case where the Request-URI is an abs_path, it must begin with a "/". All these characters are represented in 7-bit ASCII, i.e., the most significant bit (msb) is set to zero. A byte may be inserted at the beginning of the compressed Request-URI with the msb set to 1 (one) to denote a compression indicator. This representation is typically used to indicate the number of characters matched in the left-to-right direction.

The same type of representation may be used for the right-to-left indicator. A byte may be placed at the end of the compressed Request-URI to indicate how many characters have been matched starting at the last and moving towards the first. This right-to-left compression indicator would have the msb set to 1 (one). Herein lies the problem. The above syntax allows characters at the end of the Request-URI to include national characters as described above. These, too, can have the msb set to 1 (one). There would be no reliable way to distinguish between a right-to-left compression indicator and a valid national character if the compression indicator were placed at the end. Therefore, a better place for it is immediately following the left-to-right indicator at the front of the compressed Request-URI.

However, this leads to a further complication. The compression indicators consist of the msb set to 1 (one) followed by a count of characters. This count may vary in size from 0 to infinity. Practically speaking, 64K (65,535) is a good upper bound. This fits nicely into 2 bytes, but given the need for a compression indicator bit, the 16 bits would need to be encoded using 3 bytes. A variable length encoding scheme would allow the compression indicator to vary in size from 1–3 bytes. This makes sense if the overall compression scheme is to be optimal. Given that a compression indicator may vary in size, e.g., from 1 to 3 bytes, then it becomes more difficult to distinguish a left-to-right indicator byte from a right-to-left indicator byte if the bytes are contiguous and only the msb is used to mark an indicator.

Figure 2:
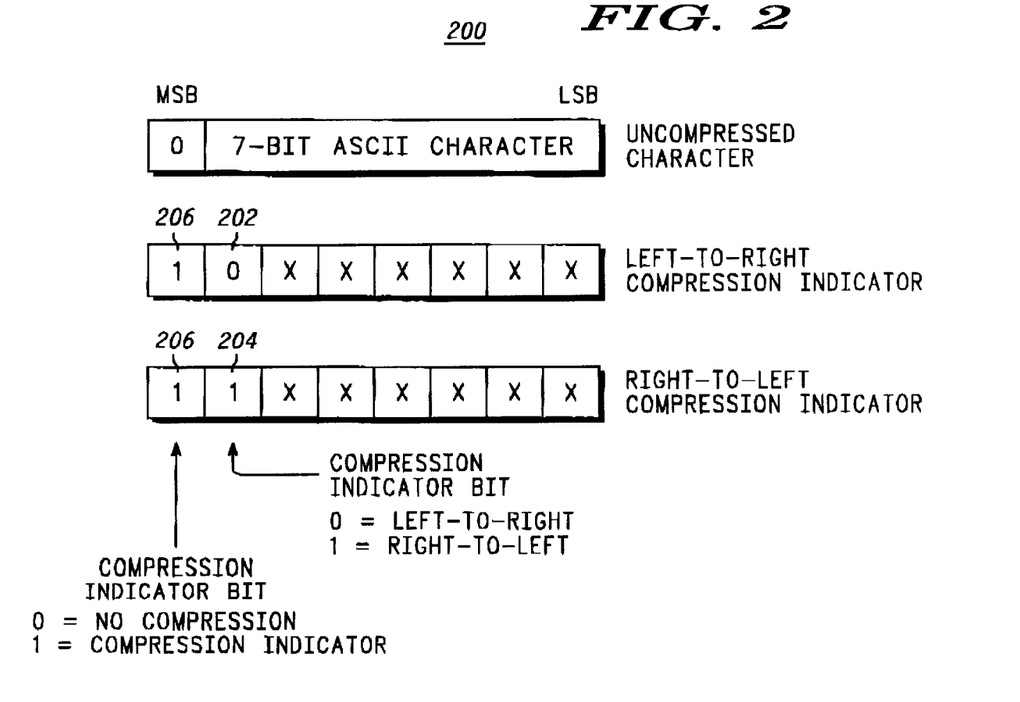
FIG. 2 illustrates the format of a compression indicator in accordance with the present invention.

Another bit may be used to distinguish left-to-right from right-to-left. The msb-1 is typically set to 0 (zero) (202) to mark left-to-right and set to 1 (one) (204) to mark right-to-left. The remaining six bits are used to encode the respective counts. The format of the compression indicator (206) is shown in FIG. 2, numeral 200. That is, when compression is used, the compression indicator bit is typically set to 1 (one) (206), and where there is no compression, the compression indicator bit is typically set to 0 (zero).

Figure 3:
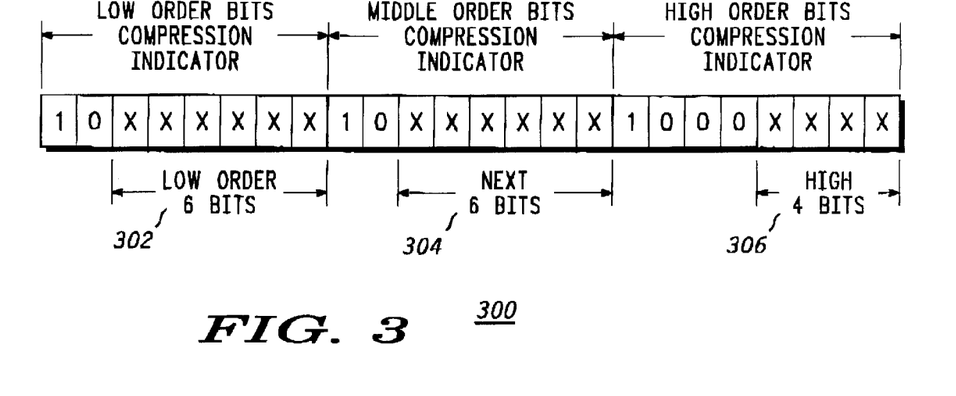
FIG. 3 illustrates an example of the construction of a left-to-right compression indicator for unsigned integers in accordance with the present invention.

As set forth above, compression indicators may vary in length depending on the size of the count to be encoded. FIG. 3, numeral 300, illustrates the construction of an example of a left-to-right compression indicator for the unsigned integers in the range 8,192–65,535 (requires 13–16 bits) in accordance with the present invention. Compression indicator bytes are chained together. Each byte contains 6 bits of the unsigned integer to be encoded. The same chaining principle applies to left-to-right and right-to-left compression indicators. This is an efficient mechanism for encoding counts of varying sizes and is not limited to the 16 bits (6 low order bits (302), a next 6 bits (304) and 4 high order bits (306)) shown in this example.

A final complication results when the first character of the uncompressed characters has the msb set to 1 (one). This would normally indicate a compression indicator byte, and a misinterpretation would occur at the receiver (decompression). In order to eliminate this misinterpretation, an escape byte is added to the beginning of the uncompressed characters. The escape byte is chosen from the set of CTL characters (ASCII 0–31). In this instantiation CTL-A (0x01) is used. This escape mechanism is used only when the first uncompressed character has the msb set to 1 (one). In general, this case is rather unlikely to occur since it is a violation of the Request-URI grammar. Other methods could be used to delimit the compression indicators from the uncompressed characters, but they would not be as efficient.

With respect to the first five Request-URIs shown above, the scheme of the present invention generates the following:

```
current =
    http://www.ai.mit.edu/stocks/topstocks.html
previous = <empty>
***** left-to-right = 0
***** right-to-left = 0
***** compressed URI =
http://www.ai.mit.edu/stocks/topstocks.html
***** savings = 0        [1:1]
current = http://www.ai.mit.edu/stocks/stock-
graph.gif
previous =
    http://www.ai.mit.edu/stocks/topstocks.html
***** left-to-right = 29
[http://www.ai.mit.edu/stocks/]
***** right-to-left = 0
***** compressed URI = <9D>stock-graph.gif
***** savings = 28       [2.75:1]
```

Note: <9D> is the hexademical representation of the encoded value of the left-to-right count. The msb is set to 1 (one) to mark the character as a compression indicator. The msb-1 is set to 0 (zero) to mark the character as a left-to-right compression indicator.

```
current =
    http://www.ai.mit.edu/stocks/g/MOT.html
previous = http://www.ai.mit.edu/stocks/stock-
graph.gif
***** left-to-right = 29
[http://www.ai.mit.edu/stocks/]
***** right-to-left = 0
***** compressed URI = <9D>g/MOT.html
***** savings = 28       [2.75:1]
current =
    http://www.ai.mit.edu/stocks/price_graphs/
MOT.gif
previous =
    http://www.ai.mit.edu/stocks/g/MOT.html
***** left-to-right = 29
[http://www.ai.mit.edu/stocks/]
***** right-to-left = 0
***** compressed URI = <9D>price_graphs/MOT.gif
***** savings = 28       [2.75:1]
current =
    http://www.ai.mit.edu/stocks/vol_graphs/MO
T.gif
previous =
    http://www.ai.mit.edu/stocks/price_graphs/
MOT.gif
***** left-to-right = 29
[http://www.ai.mit.edu/stocks/]
***** right-to-left = 15    [_graphs/MOT.gif]
***** compressed URI = <9D><CF>vol
***** savings = 42       [9.40:1]
```

Note: <CF> is the hexademical representation of the encoded value of the right-to-left count. The msb is set to 1 (one) to mark the character as a compression indicator. The msb-1 is set to 1 (one) to mark the character as a right-to-left compression indicator.

The decompression process undoes the compression process by copying the matching characters from previous to uncompressed based on the left-to-right and right-to-left compression indicators and the intervening uncompressed characters in current. Decompressing the above example yields the following:

```
current =
    http://www.ai.mit.edu/stocks/topstocks.html
previous = <empty>
***** left-to-right = 0
***** right-to-left = 0
***** uncompressed URI =
http://www.ai.mit.edu/stocks/topstocks.html
current = <9D>stock-graph.gif
previous =
    http://www.ai.mit.edu/stocks/topstocks.html
***** left-to-right = 29
[http://www.ai.mit.edu/stocks/]
***** right-to-left = 0
***** uncompressed URI =
http://www.ai.mit.edu/stocks/stock-graph.gif
```

Note: <9D> is the hexademical representation of the encoded value of the left-to-right count. The msb is set to 1 (one) to mark the character as a compression indicator. The msb-1 is set to 0 (zero) to mark the character as a left-to-right compression indicator.

```
current = <9D>g/MOT.html
previous = http://www.ai.mit.edu/stocks/stock-
graph.gif
***** left-to-right = 29
[http://www.ai.mit.edu/stocks/]
***** right-to-left = 0
***** uncompressed URI =
http://www.ai.mit.edu/stocks/g/MOT.html
current = <9D>price_graphs/MOT.gif
previous =
    http://www.ai.mit.edu/stocks/g/MOT.html
***** left-to-right = 29
[http://www.ai.mit.edu/stocks/]
***** right-to-left = 0
***** uncompressed URI =
    http://www.ai.mit.edu/stocks/price_graphs/
    MOT.gif
current = <9D><CF>vol
previous =
    http://www.ai.mit.edu/stocks/price_graphs/
MOT.gif
***** left-to-right = 29
[http://www.ai.mit.edu/stocks/]
```

-continued

```
***** right-to-left = 15    [_graphs/MOT.gif]
***** uncompressed URI =
    http://www.ai.mit.edu/stocks/vol_graphs/
    MOT.gif
```

Note: <CF> is the hexademical representation of the encoded value of the right-to-left count. The msb is set to 1 (one) to mark the character as a compression indicator. The msb-1 is set to 1 (one) to mark the character as a right-to-left compression indicator.

The compression scheme of the present invention only requires that the sender and receiver keep track of the previously sent URI. This is a major advantage over LZW and other dictionary-based compression methods in that much less state needs to be saved. The sender can generate an uncompressed URI at any time. This can be helpful for synchronizing the session. The compression process assumes that the lower layers of the protocol stack deliver error-free messages. In the event that sender receives an inordinate amount of error responses from the receiver, an uncompressed URI may be sent in case the compression process has lost synchronization.

Figure 4:
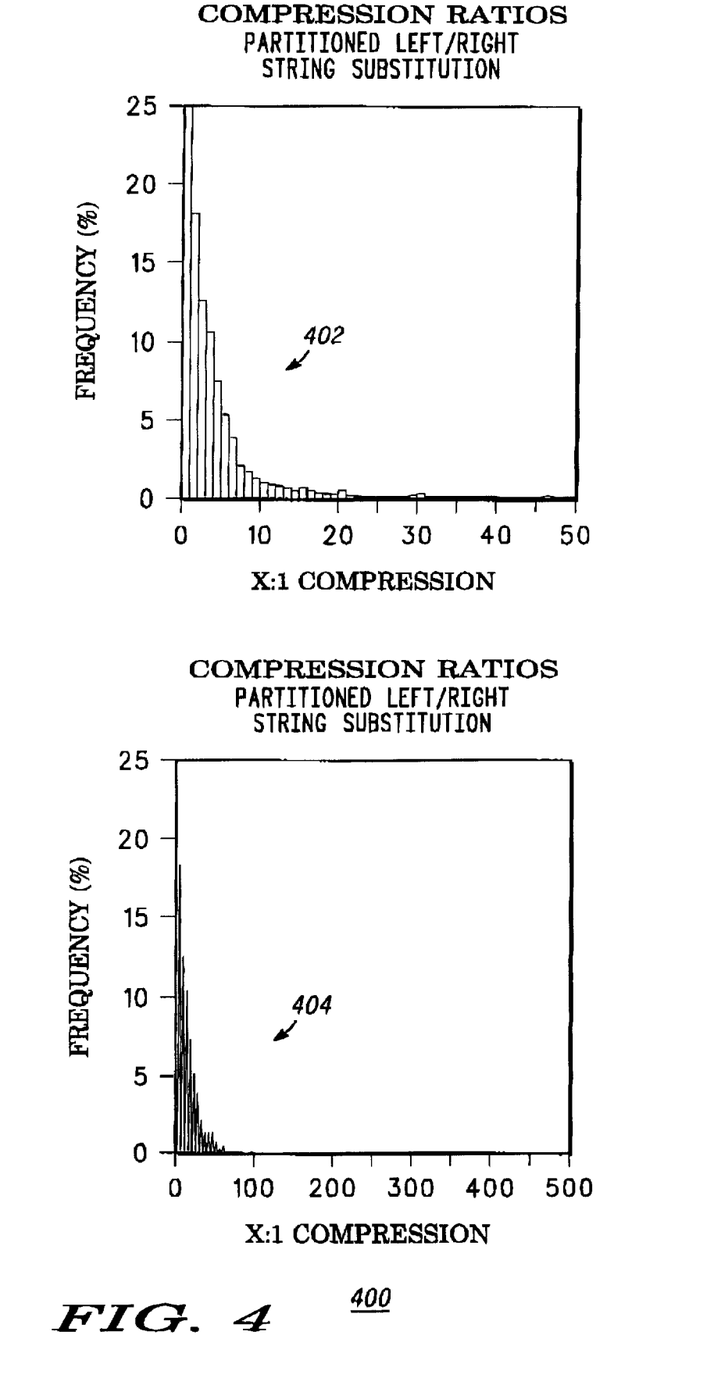
FIG. 4 illustrates two graphs for a large sample of Request-URIs.

The results from running the compression scheme of the present invention on the Request-URIs shown above provided a range of compression ratios from 1:1 to 31:1. The latter was a case where an entire Request-URI was replaced by a single left-to-right compression indicator with a count of 31. There were other instances of 11.50:1, 9.4:1, 9.25:1, etc. This was a relatively small sample and only for a single user. FIG. 4, numeral 400, illustrates two graphs for a much larger sample (approximately 3 million Request-URIs). The top graph (402) shows the frequency in percent of the compression ratios from 1:1 to 50:1. The ratios are real numbers, such as 9.4:1. The bottom graph (404) shows the frequency in percent of all the compression ratios found in the sample. Note that 447:1 is the highest ratio found. The higher compression ratios result from relatively long Request-URIs (greater than 1000 bytes) used in queries (searches, forms). This is an important observation since wireless users will undoubtedly use queries as part of their wireless web activity, and large requests are costly for paging, Ardis (a nationwide two-way data communications network enabling in building and on street communications between mobile workers and host sites), CDPD, SMS (short message service), etc., in terms of capacity and dollars-per-byte.

Figure 5:
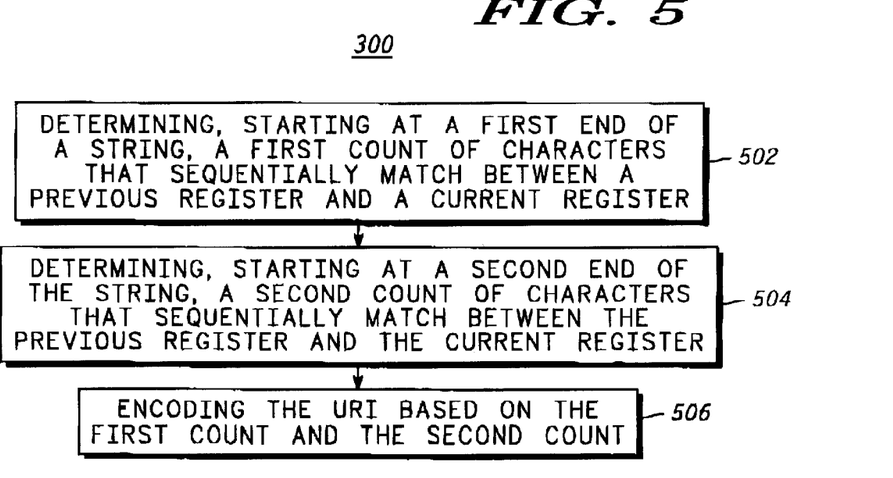
FIG. 5 is a flow chart illustrating one embodiment of steps of a method for compressing URIs in accordance with the present invention.

FIG. 5, numeral 500, is a flow chart illustrating one embodiment of steps of compressing URIs in accordance with the present invention. The method provides for compressing a universal resource identifier URI and includes the steps of: (A) determining (502), starting at a first end of a string, a first count of characters that sequentially match between a previous register and a current register; (B) determining (504), starting at a second end of the string, a second count of characters that sequentially match between the previous register and the current register, and (C) encoding (506) the URI based on the first count and the second count.

Figure 6:
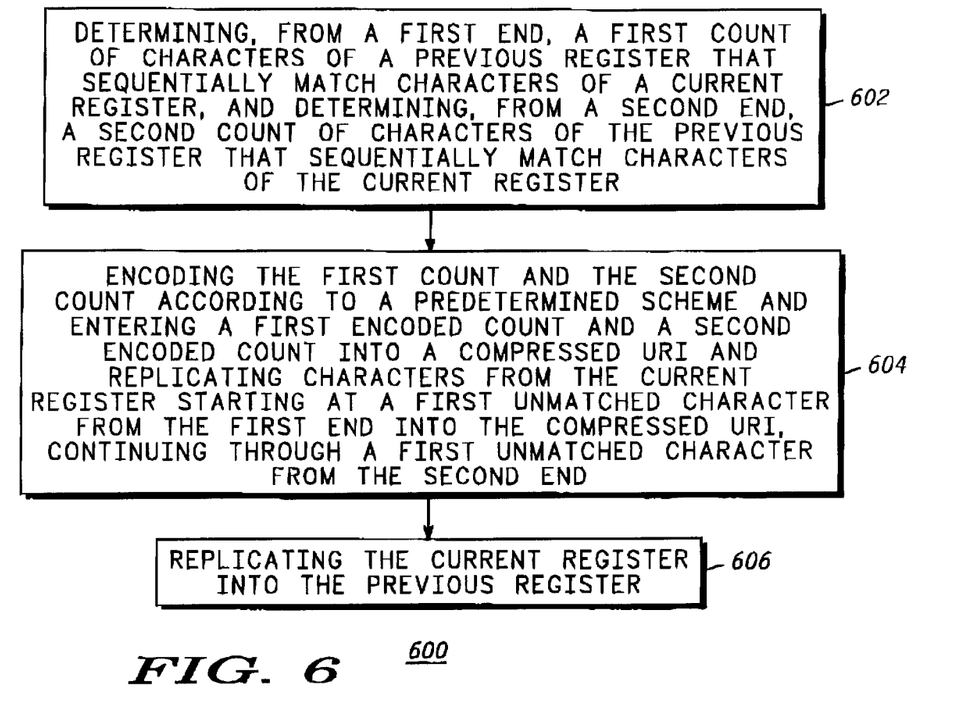
FIG. 6 is a flow chart illustrating another embodiment of steps of a method for compressing URIs in accordance with the present invention.

FIG. 6, numeral 600, is a flow chart illustrating another embodiment of steps of compressing URIs in accordance with the method of the present invention. This embodiment includes the steps of: (A) determining (602), from a first end, a first count of characters of a previous register that sequentially match characters of a current register, and determining, from a second end, a second count of characters of the previous register that sequentially match characters of the current register; (B) encoding (604) the first count and the second count according to a predetermined scheme and entering a first encoded count and a second encoded count into a compressed URI; and replicating characters from the current register starting at a first unmatched character from the first end into the compressed URI, continuing through a first unmatched character from the second end; and (C) replicating (606) the current register into the previous register.

Figure 7:
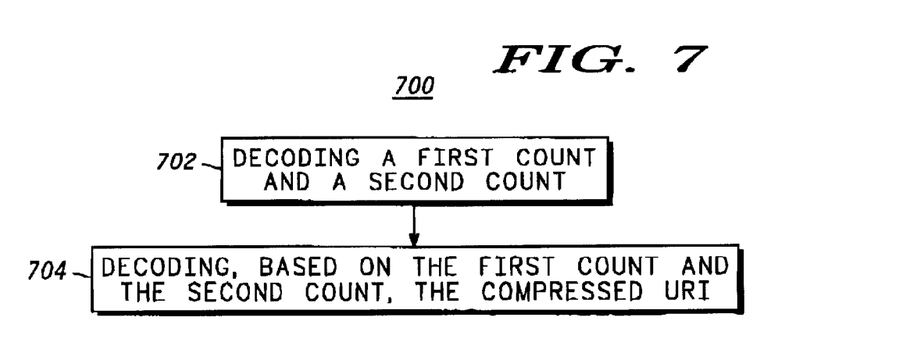
FIG. 7 is a flow chart illustrating one embodiment of steps of a method for decompressing URIs in accordance with the present invention.

FIG. 7, numeral 700, is a flow chart illustrating one embodiment of steps of decompressing URIs in accordance with the present invention. The method for decompressing a compressed universal resource identifier URI includes the steps of: (A) decoding (702) a first count and a second count, and (B) decoding (704), based on the first count and the second count, the compressed URI.

Figure 8:
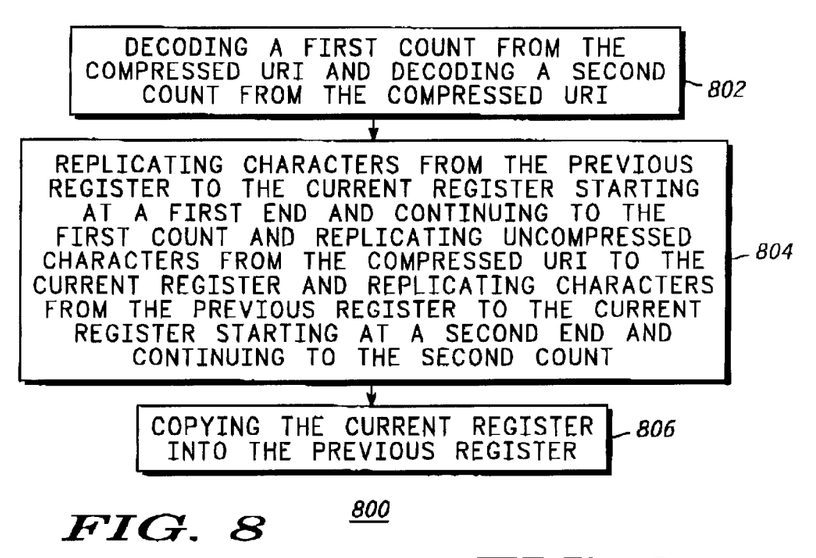
FIG. 8 is a flow chart illustrating another embodiment of steps of a method for decompressing URIs in accordance with the present invention.

FIG. 8, numeral 800, is a flow chart illustrating another embodiment of steps of decompressing URIs in accordance with the method of the present invention. This embodiment includes the steps of: (A) decoding (802) a first count from the compressed URI and decoding a second count from the compressed URI; (B) replicating (804) characters from the previous register to the current register starting at a first end and continuing to the first count and replicating uncompressed characters from the compressed URI to the current register and replicating characters from the previous register to the current register starting at a second end and continuing to the second count; and (C) copying (806) the current register into the previous register.

Figure 9:
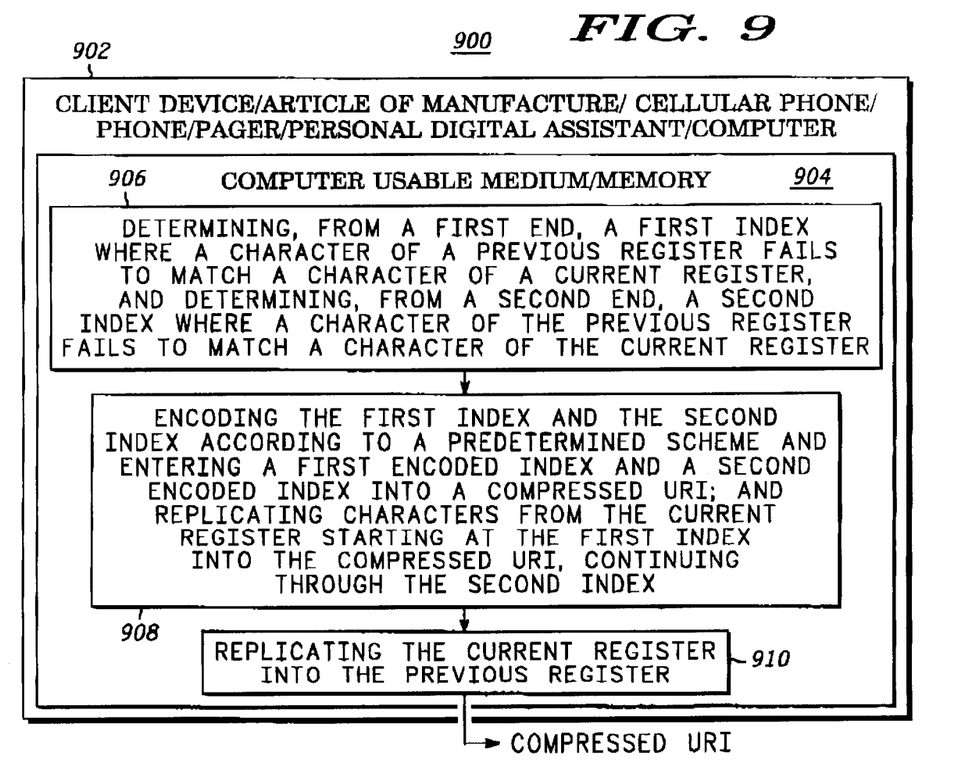
FIG. 9 is a block diagram of one embodiment of one embodiment of a client device/article of manufacture having a computer usable medium/memory with computer readable program code thereon for compressing a universal resource identifier URI in accordance with the present invention.

FIG. 9, numeral 900, is a block diagram of one embodiment of a client device/article of manufacture (902) having a computer usable medium/memory (904) with computer readable program code thereon for compressing a universal resource identifier URI, where a previous register is initialized, wherein the computer readable program code is implemented in accordance with the present invention. The steps implemented by the code include: (A) determining (906), from a first end, a first count of characters of a previous register that sequentially match characters of a current register, and determining, from a second end, a second count of characters of the previous register that sequentially match characters of the current register; (B) encoding (908) the first count and the second count according to a predetermined scheme and entering a first encoded count and a second encoded count into a compressed URI; and replicating characters from the current register starting at a first unmatched character from the first end into the compressed URI, continuing through a first unmatched character from the second end; and (C) replicating (910) the current register into the previous register. Typically, the client device/article of manufacture is a cellular phone, a phone, a pager, a personal digital assistant, a computer or the like.

Figure 10:
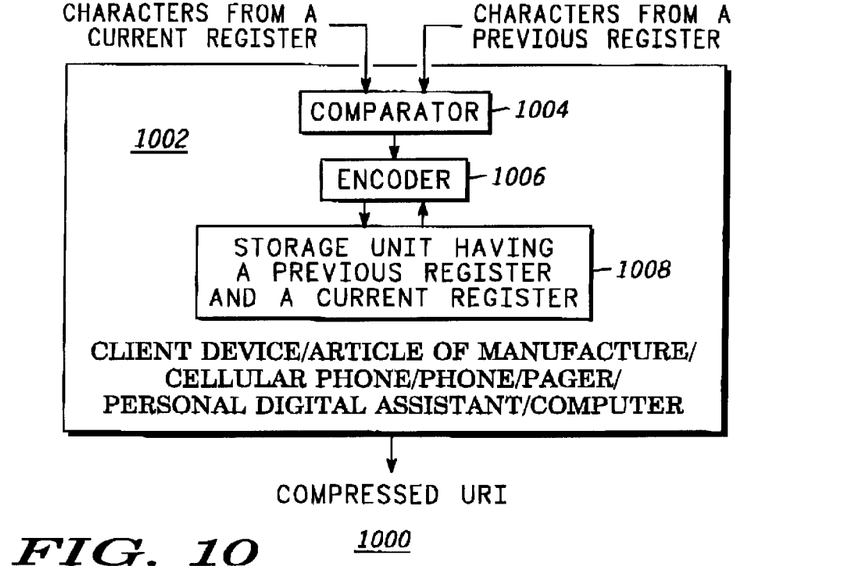
FIG. 10 is a block diagram of another embodiment of a client device/article of manufacture for compressing a universal resource identifier URI in accordance with the present invention.

FIG. 10, numeral 1000, is a block diagram of another embodiment of a client device/article of manufacture (1002) for compressing a universal resource identifier URI, where a previous register is initialized, in accordance with the present invention. The client device/article of manufacture (1002) includes: (A) a comparator (1004), for determining, from a first end, a first count of characters of a previous register that sequentially match characters of a current register, and determining, from a second end, a second count of characters of the previous register that sequentially match characters of the current register; (B) an encoder (1006), coupled to the comparator (1004), for encoding the first count and the second count according to a predetermined scheme and entering a first encoded count and a second encoded count into a compressed URI; and replicating characters from the current register starting at a first unmatched character from the first end into the compressed URI, continuing through a first unmatched character from the second end; and (C) a storage unit (1008), coupled to the encoder (1006), for replicating the current register into the previous register. Generally, the client device/article of manufacture (1002) is a cellular phone, a phone, a pager, a personal digital assistant, a computer or the like.

Figure 11:
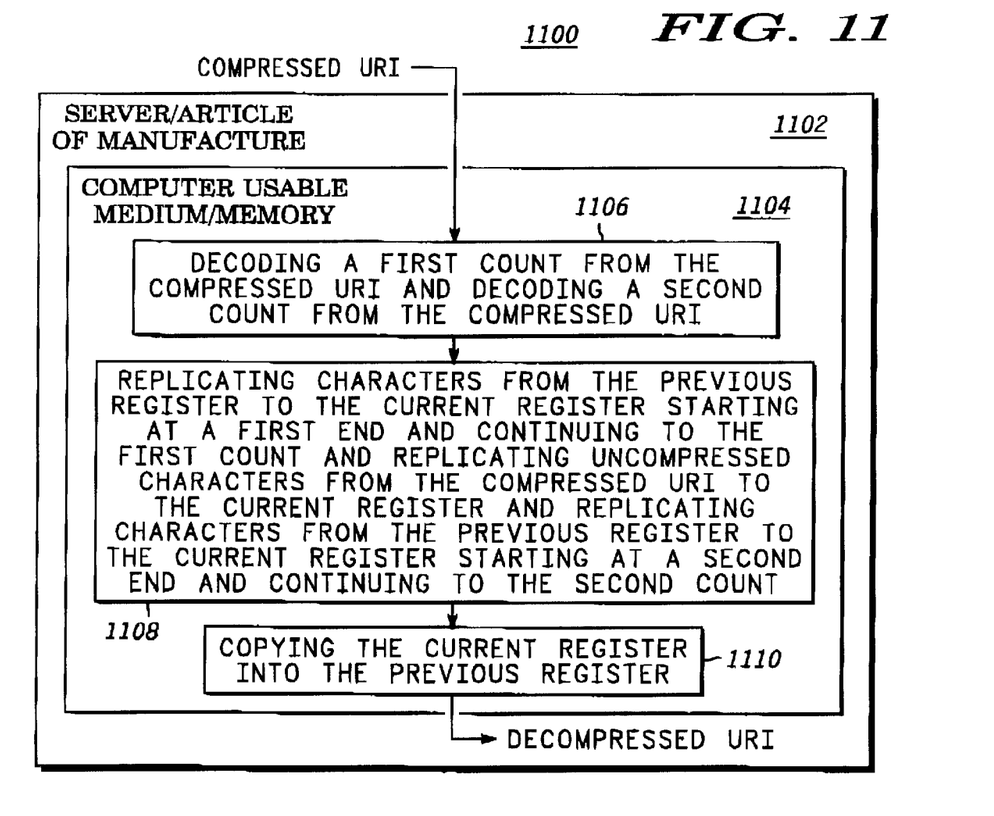
FIG. 11 is a block diagram of one embodiment of a server/article of manufacture having a computer usable medium/memory with computer readable program code thereon for decompressing universal resource identifiers in accordance with the present invention.

FIG. 11, numeral 1100, is a block diagram of one embodiment of a server/article of manufacture (1102) having a computer usable medium/memory (1104) with computer readable program code thereon for decompressing universal resource identifiers in accordance with the present invention. The computer readable program code is implemented by the steps of: (A) decoding (1106) a first count from the compressed URI and decoding a second count from the compressed URI; (B) replicating (1108) characters from the previous register to the current register starting at a first end and continuing to the first count and replicating uncompressed characters from the compressed URI to the current register and replicating characters from the previous register to the current register starting at a second end and continuing to the second count; and (C) copying (1110) the current register into the previous register.

Figure 12:
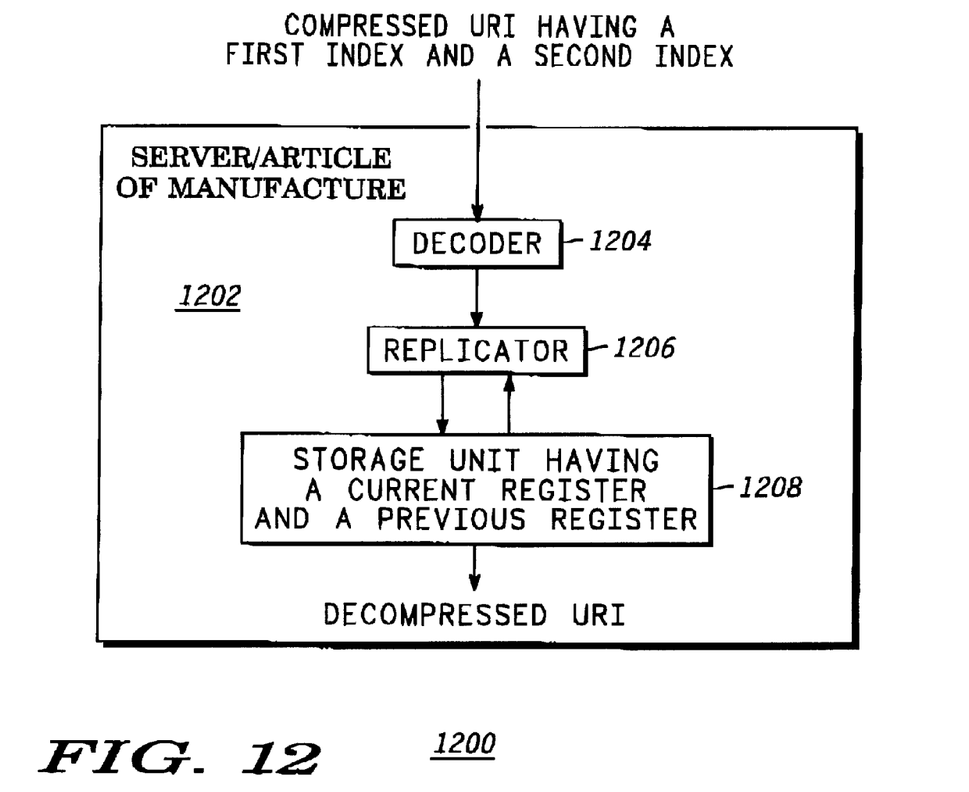
FIG. 12 is a block diagram of another embodiment of a server/article of manufacture for decompressing universal resource identifiers in accordance with the present invention.

FIG. 12, numeral 1200, is a block diagram of another embodiment of a server/article of manufacture (1202) for decompressing universal resource identifiers in accordance with the present invention. The server/article of manufacture includes: (A) a decoder (1202), for decoding a first count from the compressed URI and decoding a second count from the compressed URI; (B) a replicator (1204), coupled to the decoder (1202), for replicating characters from the previous register to the current register starting at a first end and continuing to the first count and replicating uncompressed characters from the compressed URI to the current register and replicating characters from the previous register to the current register starting at a second end and continuing to the second count; and (C) a storage unit (1206), coupled to the replicator (1204), for copying the current register into the previous register.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for compressing a universal resource identifier URI, comprising the steps of:
   determining, starting at a first end of a string, a first count of characters that sequentially match between a previous register and a current register;
   determining, starting at a second end at an opposite end of the string, a second count of characters that sequentially match between the previous register and the current register; and
   encoding the URI based on the first count and the second count.

2. A method for compressing a universal resource identifier URI, where a previous register is initialized, comprising the steps of:
   determining, from a first end, a first count of characters of a previous register that sequentially match characters of a current register, and determining, from a second end at an opposite end of the characters of the previous register, a second count of characters of the previous register that sequentially match characters of the current register;
   encoding the first count and the second count according to a predetermined scheme and entering a first encoded count and a second encoded count into a compressed URI; and
   replicating characters from the current register starting at a first unmatched character from the first end into the compressed URI, continuing through a first unmatched character from the second end; and
   replicating the current register into the previous register.

3. A method for decompressing a compressed universal resource identifier URI, where a previous register is initialized, comprising the steps of:
   decoding a first count from the compressed URI and decoding a second count from the compressed URI;
   replicating characters from the previous register to the current register starting at a first end and continuing to the first count and replicating uncompressed characters from the compressed URI to the current register and replicating characters from the previous register to the current register
   starting at a second end opposite the first end and continuing to the second count; and
   copying the current register into the previous register.

4. A client device/article of manufacture having a computer usable medium/memory with computer readable program code thereon for compressing a universal resource identifier URI, where a previous register is initialized, wherein the computer readable program code is implemented by the steps of:
   determining, from a first end, a first count of characters of a previous register that sequentially match characters of a current register, and determining, from a second end opposite the first end, a second count of characters of the previous register that sequentially match characters of the current register;
   encoding the first count and the second count according to a predetermined scheme and entering a first encoded count and a second encoded count into a compressed URI; and
   replicating characters from the current register starting at a first unmatched character from the first end into the compressed URI, continuing through a first unmatched character from the second end; and
   replicating the current register into the previous register.

5. The client device/article of manufacture of claim 4, wherein the client device/article of manufacture is one of:
   A) a cellular phone;
   B) a phone;
   C) a pager;
   D) a personal digital assistant; and
   E) a computer.

6. A client device/article of manufacture for compressing a universal resource identifier URI, where a previous register is initialized, comprising:
   (A) a comparator, for determining, from a first end, a first count of characters of a previous register that sequentially match characters of a current register, and determining, from a second end opposite the first end, a second count of characters of the previous register that sequentially match characters of the current register;

(B) an encoder, coupled to the comparator, for encoding the first count and the second count according to a predetermined scheme and entering a first encoded count and a second encoded count into a compressed URI; and replicating characters from the current register starting at a first unmatched character from the first end into the compressed URI, continuing through a first unmatched character from the second end; and (C) a storage unit, coupled to the encoder, for replicating the current register into the previous register.

7. The client device/article of manufacture of claim 6, wherein the client device/article of manufacture is one of:

A) a cellular phone;

B) a phone;

C) a pager;

D) a personal digital assistant; and

E) a computer.

8. A server/article of manufacture having a computer usable medium/memory with computer readable program code thereon for decompressing of universal resource identifiers, wherein the computer readable program code is implemented by the steps of:

decoding a first count from the compressed URI and decoding a second count from the compressed URI;

replicating characters from the previous register to the current register starting at a first end and continuing to the first count and replicating uncompressed characters from the compressed URI to the current register and replicating characters from the previous register to the current register starting at a second end opposite the first end and continuing to the second count; and copying the current register into the previous register.

9. A server/article of manufacture for decompressing of universal resource identifiers, comprising:

(A) a decoder, for decoding a first count from the compressed URI and decoding a second count from the compressed URI;

(B) a replicator, coupled to the decoder, for replicating characters from the previous register to the current register starting at a first end and continuing to the first count and replicating uncompressed characters from the compressed URI to the current register and replicating characters from the previous register to the current register starting at a second end opposite from the first end and continuing to the second count; and (C) a storage unit, coupled to the replicator, for copying the current register into the previous register.

* * * * *

UNITED STATES PATENT AND TRADEMARK OFFICE
CERTIFICATE OF CORRECTION

PATENT NO.     : 6,493,766 B1                                                    Page 1 of 1
DATED          : December 10, 2002
INVENTOR(S)    : Dale Robert Buchholz and James Edward Van Peursem It is certified that error appears in the above-identified patent and that said Letters Patent is hereby corrected as shown below:

Drawings,
Figure 2, "Item 204" should be labeled -- Substitute Direction Bit --
Figure 5, "marker 300" should be -- 500 --

Signed and Sealed this

Fourteenth Day of October, 2003

JAMES E. ROGAN
*Director of the United States Patent and Trademark Office*